(12) United States Patent
Lundgren

(10) Patent No.: US 7,607,616 B2
(45) Date of Patent: Oct. 27, 2009

(54) DOCKING DEVICE

(75) Inventor: Mark A. Lundgren, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 11/564,394

(22) Filed: Nov. 29, 2006

(65) Prior Publication Data

US 2008/0121760 A1 May 29, 2008

(51) Int. Cl.
*B64G 1/64* (2006.01)
*G01S 17/74* (2006.01)

(52) U.S. Cl. ............... 244/172.4; 356/620; 244/135 A

(58) Field of Classification Search ............. 244/135 A, 244/172.4, FOR. 108; D21/306; 33/293; 356/138–155, 620; 40/582; 359/439, 613, 359/614, 839, 546–548
See application file for complete search history.

(56) References Cited

U.S. PATENT DOCUMENTS

| | | | | |
|---|---|---|---|---|
| 3,224,709 A | * | 12/1965 | Blizard | 244/172.4 |
| 3,285,533 A | * | 11/1966 | Jernigan, Jr. | 244/172.4 |
| 3,366,923 A | * | 1/1968 | Panerai et al. | 340/946 |
| 5,109,345 A | * | 4/1992 | Dabney et al. | 701/226 |
| 5,119,305 A | * | 6/1992 | Ferro | 701/300 |
| 5,123,656 A | * | 6/1992 | Green | 273/400 |
| 5,291,195 A | * | 3/1994 | Gross | 340/958 |
| 5,302,816 A | * | 4/1994 | Tulet | 250/206.2 |
| 5,734,736 A | * | 3/1998 | Palmer et al. | 382/103 |
| 6,669,145 B1 | * | 12/2003 | Green | 244/135 A |
| 6,954,551 B2 | | 10/2005 | Weismuller | 382/209 |
| 6,960,750 B2 | * | 11/2005 | Doane | 250/206.1 |
| 7,010,401 B1 | * | 3/2006 | Richburg et al. | 701/23 |
| 7,039,506 B1 | * | 5/2006 | Richburg et al. | 701/23 |
| 7,075,736 B1 | | 7/2006 | Lundgren | 359/775 |
| 7,093,314 B2 | * | 8/2006 | Hutton et al. | 14/71.5 |
| 7,137,162 B2 | * | 11/2006 | Spencer et al. | 14/71.5 |
| 7,277,213 B2 | * | 10/2007 | Watson et al. | 359/214.1 |
| 2009/0051772 A1 | * | 2/2009 | Rhoads | 348/187 |

* cited by examiner

*Primary Examiner*—Michael R Mansen
*Assistant Examiner*—Brian M O'Hara
(74) *Attorney, Agent, or Firm*—Klein, O'Neill & Singh, LLP

(57) ABSTRACT

A docking target indicator for a docking device is provided. The docking target indicator comprises a base layer, having a rear surface and a front surface; wherein the front surface of the base layer is reflective; and a baffle structure is secured to the base layer.

21 Claims, 10 Drawing Sheets

Section A-A'

Section B-B'

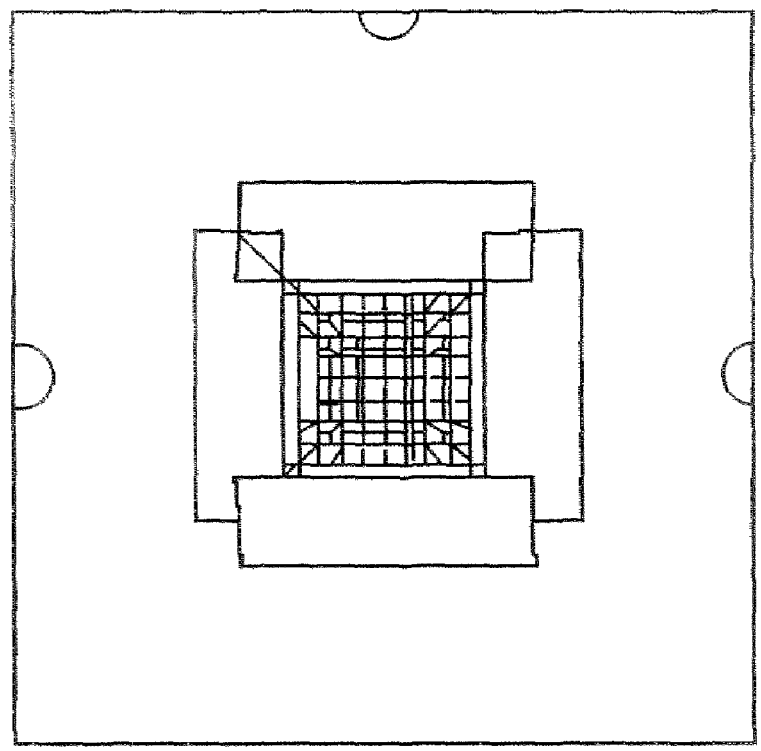
FIG. 6C
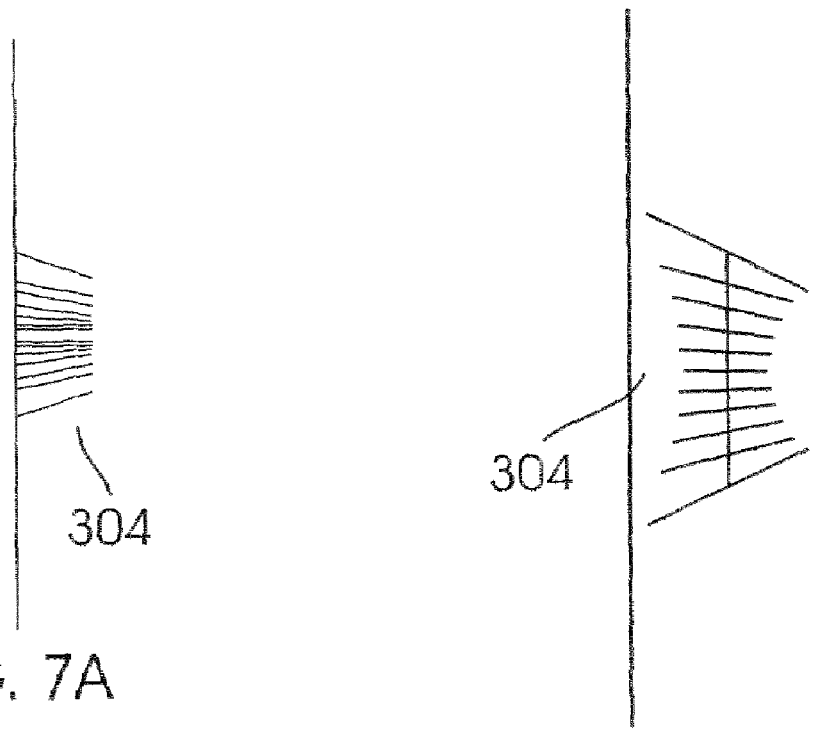
FIG. 7A
FIG. 7B

DOCKING DEVICE

FIELD OF THE INVENTION

This disclosure relates generally to a docking device, and more particularly, to docking targets for docking device.

BACKGROUND

Spacecraft use docking systems to dock one space vehicle with another. Space vehicles include satellites, space shuttles, nano-satellites, free-flying satellites and similar other space objects. For purposes of this disclosure, the international space station may also be considered a space vehicle.

Docking systems typically include a docking device having reflective sensors (also referred to as "docking targets") for generating a visual output. Cameras for machine vision systems monitor the visual output and provide location data for navigation control of space vehicles. Navigation control of space vehicles depends on the accuracy of the collected data.

Space vehicle docking systems typically use sensor computers (like autonomous rendezvous and docking (ARD) sensor) for interpreting visual output and process information for navigational computers. Navigational computers analyze information received from the sensor computer, process the information and provide navigational data to flight computers. Flight computers provide thrusters with information for controlling the position and attitude of the space vehicle in three dimensional spaces.

Docking cameras of machine vision systems work in visible or infrared light. Therefore, it is a desirable for docking devices to work in infrared and visible wavelengths.

Docking devices known in the prior art have docking targets with vertical projections and flat spots. Flat spots provide only two dimensional data while the vertical projections enable docking cameras to measure a three dimensional angle unambiguously. These vertical projections move with respect to the flat spots when viewed from different angles. A two dimensional projection is formed which helps define the position and relative orientation of the vehicle.

FIG. 1A shows a conventional docking target 100 having flat spots (102) and a vertical projection (104). Vertical projection 104 may be round (FIG. 1A) or they may be rectangular 104' (FIG. 1B).

These vertical projections are fragile and inconvenient. Any mistake in maneuvering of a space vehicle may damage the protrusions. Replacement of docking targets would be expensive and inconvenient.

Lenticular targets and holograms (shown as 100A) that are flat may also be used as docking targets. However, lenticular targets and holograms are wavelength sensitive and work only in visible wavelengths and do not operate in infrared wavelengths. Optics used in lenticular targets and holograms glint under harsh space lighting and do not transmit infrared wavelength. Furthermore, holograms, including white light holograms, require controlled lighting at specific angles, which is generally not the case in space docking as sunlight is very harsh and is at random angles. Therefore, lenticular targets and holograms are not effective as docking targets in space vehicles.

Therefore, there is a need for a docking device that has flat docking targets, is not constrained by visible light or infrared light and which can provide three dimensional data for safe and effective docking.

SUMMARY OF THE INVENTION

In one embodiment a docking target indicator is provided. The docking target indicator comprises a base layer, having a rear surface and a front surface; wherein the front surface of the base layer is reflective; and a baffle structure is secured to the base layer.

In another embodiment a docking target for a docking device is provided. The docking target comprises a docking target indicator having a base layer with a rear surface and a front surface; wherein the front surface of the base layer is reflective; and a baffle structure is secured to the base layer over the reflective front surface.

This brief summary has been provided so that the nature of the invention may be understood quickly. A more complete understanding of the invention may be obtained by reference to the following detailed description of the preferred embodiments thereof in connection with the attached drawings.

BRIEF DESCRIPTION OF THE DRAWINGS

The foregoing features and other features of the present disclosure will now be described with reference to the drawings of a preferred embodiment. In the drawings, the same components have the same reference numerals. The illustrated embodiment is intended to illustrate, but not to limit the invention. The drawings include the following Figures:

FIG. 6C shows a schematic of a rectangular baffle structure, of an embodiment;

FIG. 7A shows a pyramidal baffle structure of a docking target indicator, of an embodiment;

FIG. 7B shows a conical baffle structure of a docking target indicator, of an embodiment;

DETAILED DESCRIPTION OF THE PREFERRED EMBODIMENTS

In one aspect of the present disclosure a docking system with a docking device is provided. The docking device of the present disclosure has flat docking targets capable of functioning in visible light as well as infrared light and provides three dimensional data for safe and accurate docking.

To facilitate an understanding of a docking system, a general overview of a docking system will be described. The specific structural components of the docking device of the present disclosure will then be described with specific reference to general structure of a docking system.

Figure 1A:
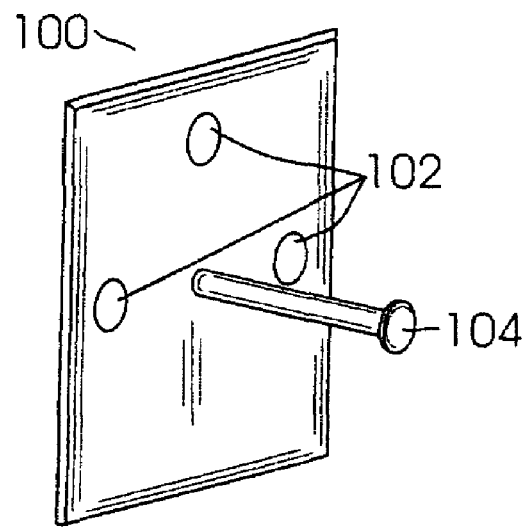
FIG. 1A shows docking target having flat spots and a vertical projection.
Figure 1B:
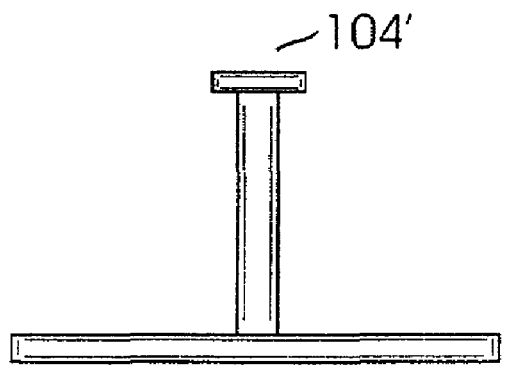
FIG. 1B shows the vertical projection of FIG. 1A with a rectangular face.
Figure 1C:
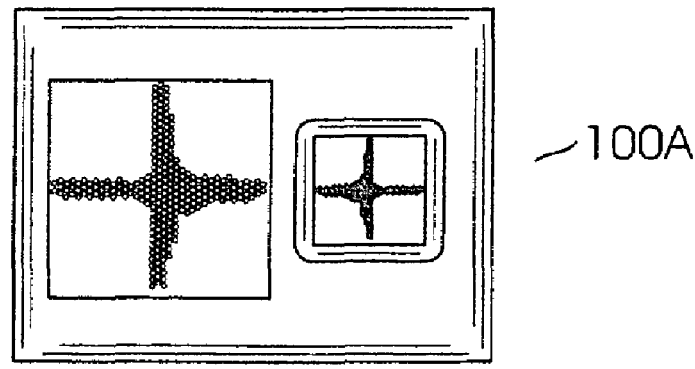
FIG. 1C shows lenticular targets and holograms used as docking targets.
Figure 2:
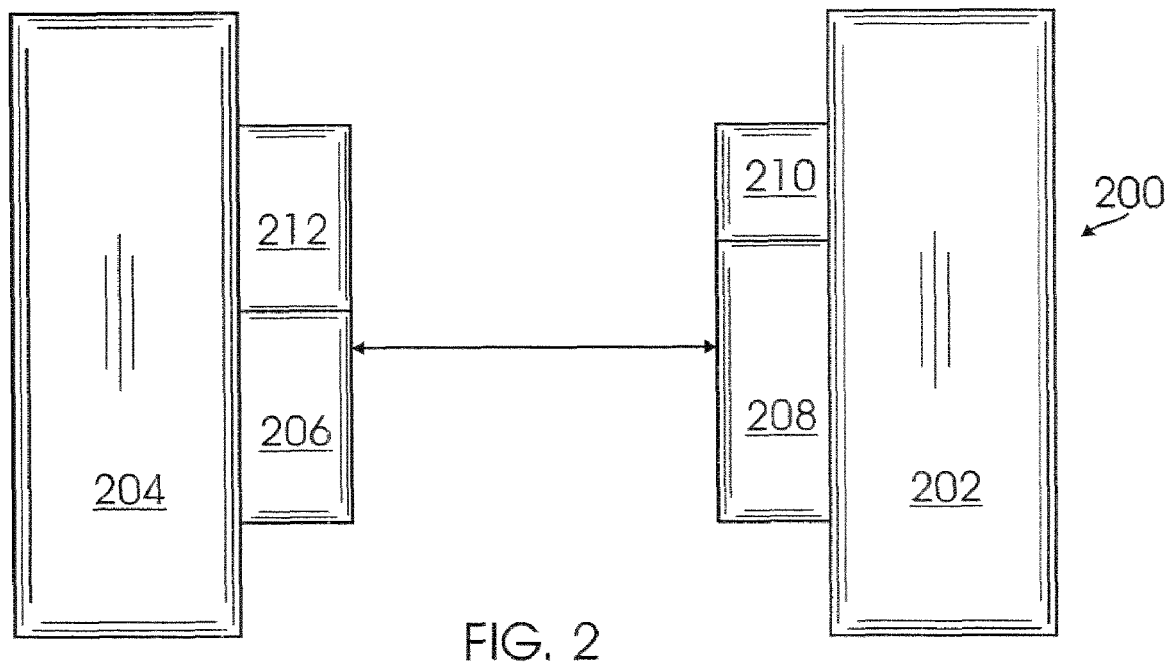
FIG. 2 shows a block diagram of a docking system, of an embodiment.

FIG. 2 shows a top level block diagram of a docking system 200 used by space vehicles 202 and 204. Although docking might be accomplished by controlling both vehicles (202 and 204), for purposes of explanation it will be assumed that one of the vehicles (204) is stationary with respect to another vehicle (202) and is not controlled in position or attitude during the docking maneuver.

The operation of navigational computer (not shown) in the approaching vehicle 202 depends on accurate input data defining the position and relative orientation of vehicle 204. Space vehicle 202 has docking device 208 and a monitoring station 210 that analyses visual output data collected by docking device 208. Monitoring station 210 may be a sensor computer or an autonomous rendezvous and docking (ARD) computer. Space vehicle 204 is also shown to have a docking device 212 and a monitoring station 206. Monitoring stations 206 and 210 may be machine vision systems or may be naked eye of the pilot/crew of the space vehicle.

Docking device 208 has reflective sensors 300 (FIG. 3) (also referred to as "docking targets") that provide visual outputs to monitoring station 206, like machine vision system. Machine vision system 206 uses visual outputs for docking on to space vehicle 202.

Figure 3:
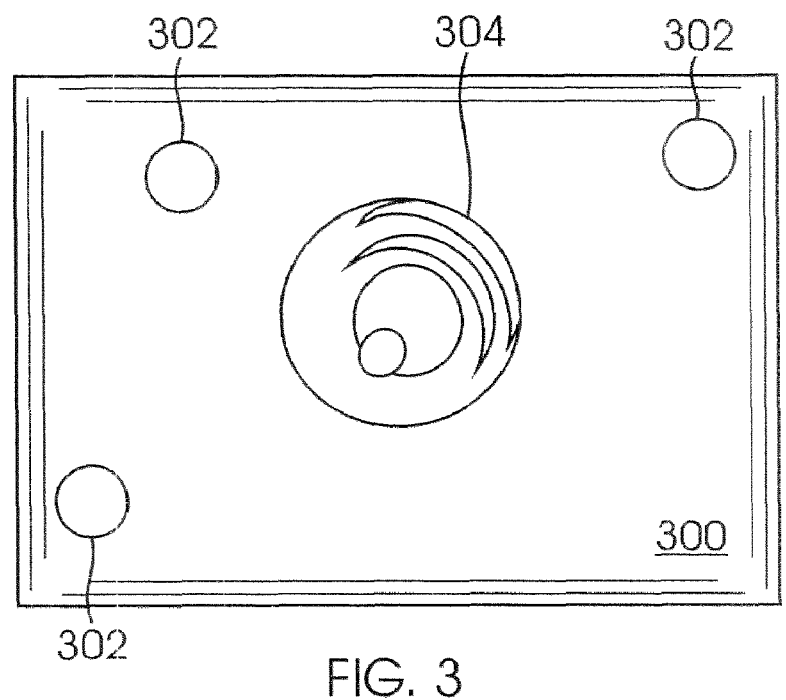
FIG. 3 shows a docking target having a vertical projection, of an embodiment.

FIG. 3 shows a docking target 300 according to one aspect of the present disclosure. Docking target 300 has flat spots 302 and a docking target indicator 304 that provides three dimensional views for docking cameras of a machine vision system. Although docking target 300 is shown to have one docking target indicator 304 for three flat spots 302, any variation in the ratio of flat spots 302 and docking target indicator 304 is within the scope of the present disclosure.

Figure 4A:
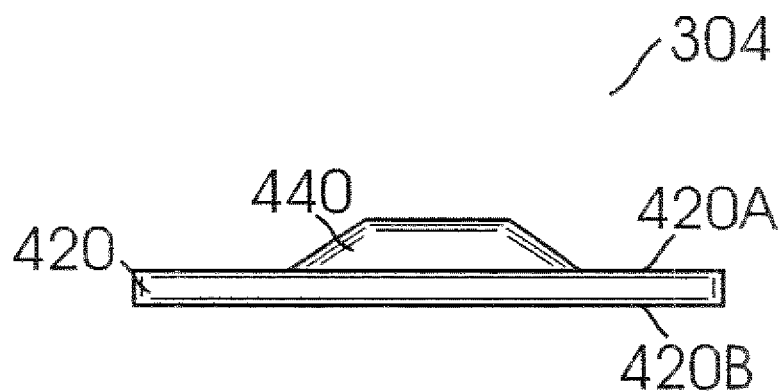
FIG. 4A shows the docking target indicator, of an embodiment.

FIG. 4A shows a docking target indicator 304 according to one aspect of the present disclosure. Docking target indicator 304 has a base layer 420 having a front surface 420A and a rear surface 420B. Base layer 420 may be formed of a metal selected from aluminum, nickel or copper. Base layer 420 may also be formed of ceramic or plastic. In one aspect of the present disclosure, base layer 420 is formed of aluminum.

Figure 4B:
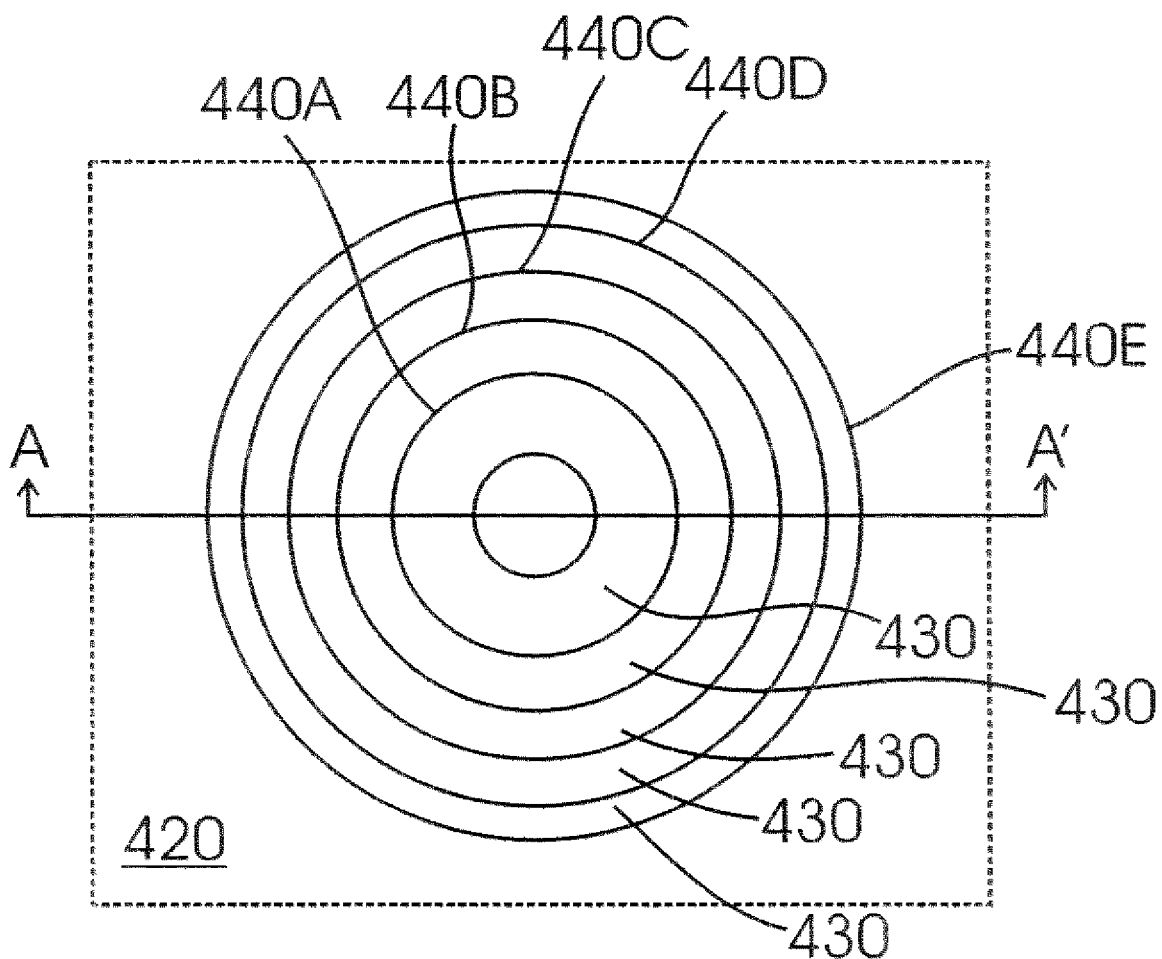
FIGS. 4B and 4C show a top view of a docking target indicator, of an embodiment.

Rear surface 420B of base layer 420 joins to docking device 208. Front surface 420A may be coated with a layer (430) of reflective material as shown in FIG. 4B. Layer 430 may be formed of a reflective metal or a ground-up semiconductor. In one aspect of the present disclosure, coating 430 includes gold. Layer 430 reflects incident light providing a visual output to a monitoring system (e.g. 206).

In one aspect of the present disclosure, front surface 420A may be coated with concentric rings 430A-430E (FIG. 4C) of a reflective material. The reflective material may be a reflective metal like gold or ground-up semiconductor.

Layer 430 is guarded by a baffle structure 440. Baffle structure 440 may be a conical structure formed by concentric conical segments of increasing diameter with respect to the center of the conical structure. The conical structure has coaxial, conical sections of increasing angle, over gold coating 430.

FIG. 4B shows top view of the docking target indicator 304 according to one aspect of the present disclosure. As shown in FIG. 4B, baffle structure 440 has a plurality of baffles 440A-440E. As an example, baffle structure 440 includes five concentric baffles 440A-440E (also referred to as vane-baffles). Baffle structure 440 may have fewer or more number of baffles to provide a desired visual output.

Figure 4C:
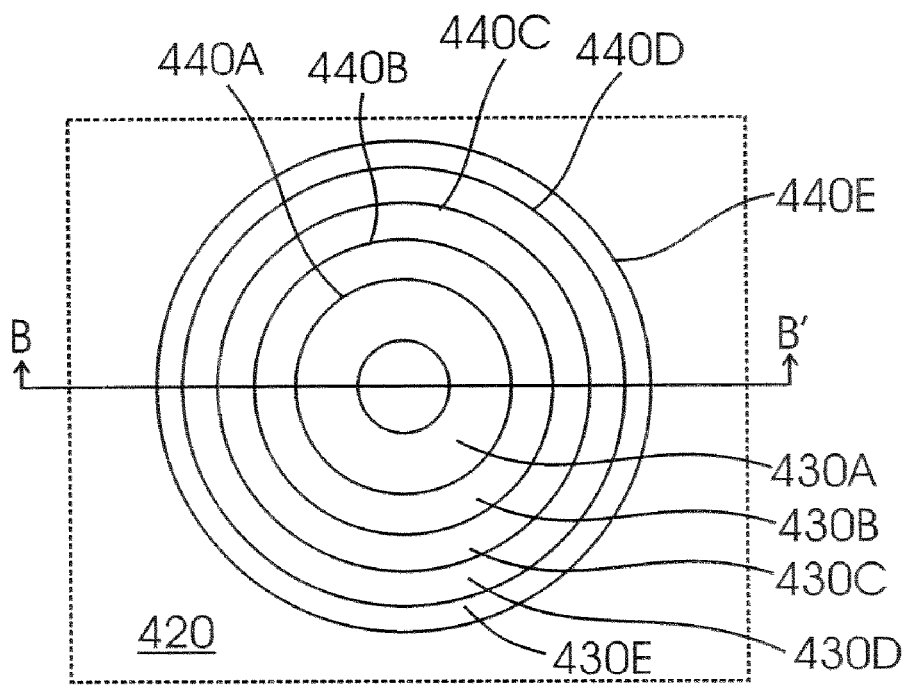

FIG. 4C shows baffle structure 440 formed over concentric gold rings 430A-430E. Vane-baffles 440A-440E are placed on the base structure alternating with both the base layer 420 and the gold layer 430.

Figure 4D:
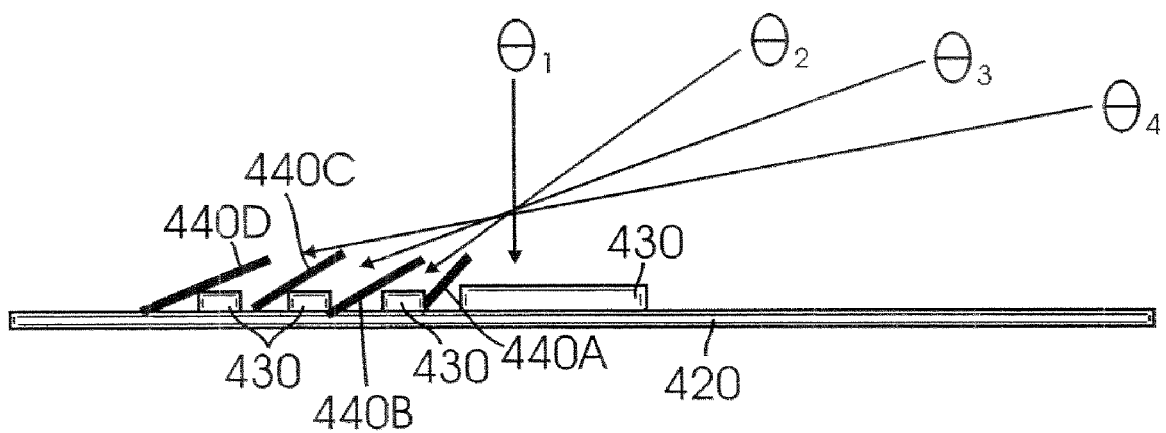
FIG. 4D shows a cross section view along line A-A' of a docking target locator, of an embodiment.
Figure 4E:
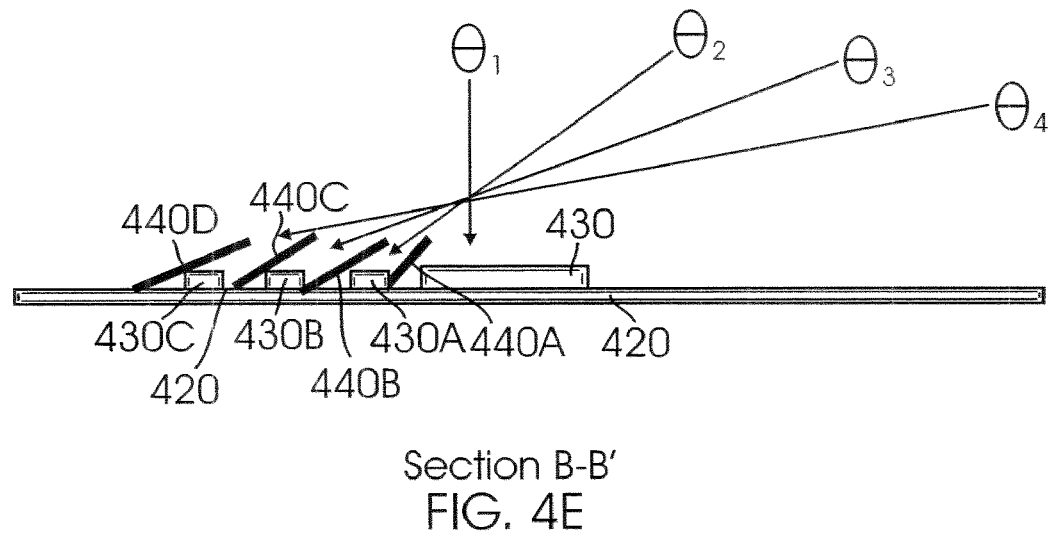
FIG. 4E shows a cross section view along line B-B' of a docking target locator, of an embodiment.

FIG. 4D shows a cross section of the docking target indicator along A-A' (FIG. 4B) while FIG. 4E shows a cross section of the docking target indicator along B-B' (FIG. 4C). A plurality of vane-baffles 440A-440E with varying angle, depth and spacing are shown, which produces the desired apparent target motion. As the viewing angle changes from $\Theta_1$ to $\Theta_4$, different parts of the underlying gold pattern are covered or revealed. Scaling of vane-baffles to change angle or diameter may be carried out to accommodate a desired configuration.

Baffle structure 440 is substantially flat and protects gold coating 430. Angled, vane-baffles (440A-440E) create a pattern that changes with angle of vision. Depending on the angle of vision, the vanes obscure the reflective surface of gold plating 430 either fully or partially, to reveal a unique observable pattern. This pattern (or visual output) is interpreted by a navigational computer while maneuvering a space vehicle.

Figure 5A:
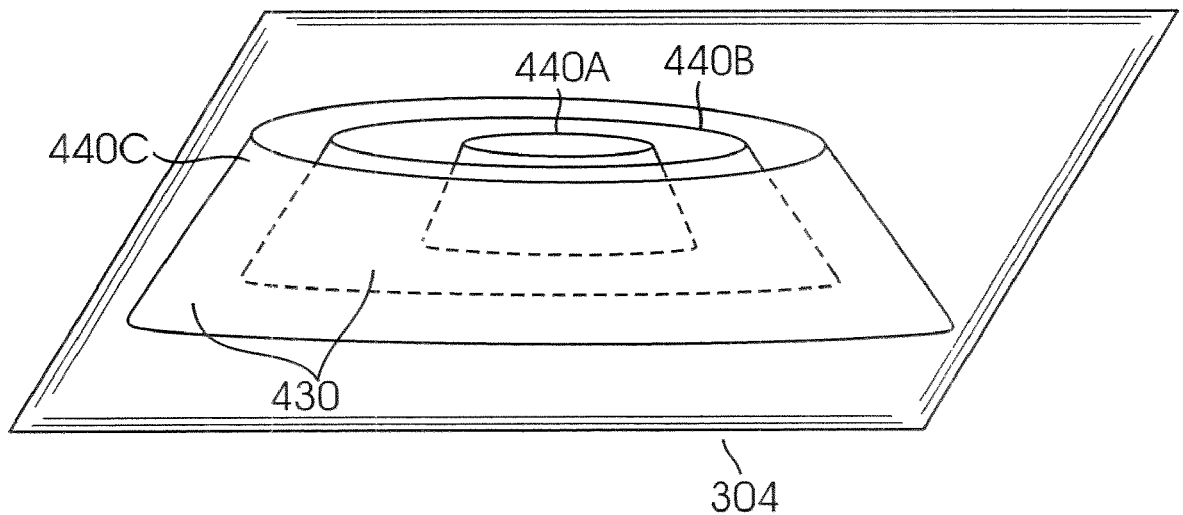
FIG. 5A shows a schematic of a docking target indicator, of an embodiment.

FIG. 5A shows another view of baffle structure 440 with coating 430. As shown, conical segments 440A-440C with varying angle and diameter with respect to center of baffle structure 440 are formed on gold coating layer 430.

Figure 5B:
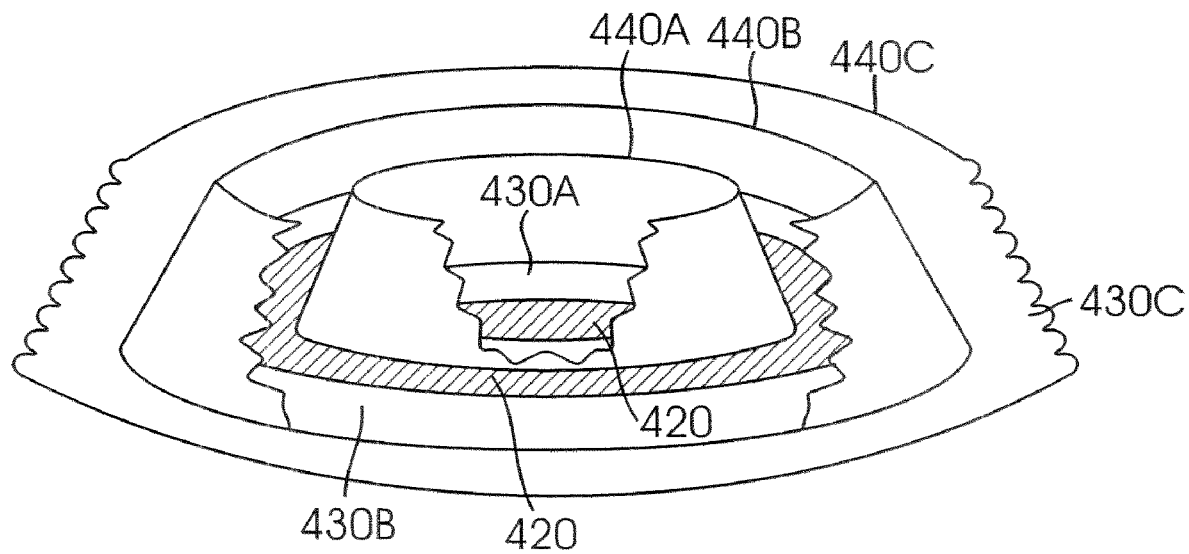
FIG. 5B shows another schematic of a docking target indicator, of an embodiment.

FIG. 5B shows yet another view of baffle structure 440 having concentric gold rings (430A-430C) on base layer 420. Conical segments 440A-440C with varying angle and diameter with respect to center of the baffle structure are formed on concentric gold rings 430A-430E.

In one aspect of the present disclosure, the baffle structure 440 may be a pyramid structure formed by rectangular segments of increasing dimensions with respect to the center of a pyramid structure. The rectangular baffle structure has columns and rows of vanes with increasing tilt, in the x and y direction, over the gold plate 430 (as shown in FIGS. 6A-6C).

Figure 6A:
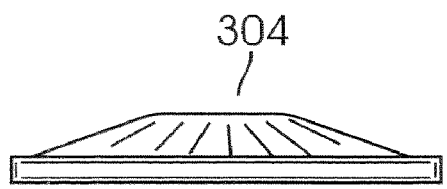
FIG. 6A shows a schematic of baffle structure having rectangular baffle segments, of an embodiment.

FIG. 6A shows a docking target indicator 304 having pyramidal baffle structure formed with rectangular baffle segments Though rectangular segments are shown to form a pyramid structure, it is within the scope of the present disclosure to use square segments to form a pyramid baffle structure.

Figure 6B:
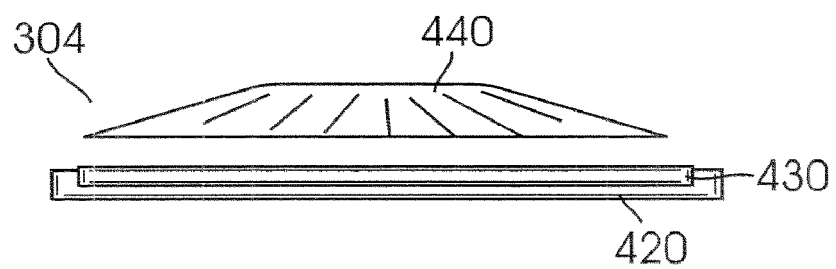
FIG. 6B shows an exploded view of the baffle structure having a rectangular grid, of an embodiment.

FIG. 6B shows an exploded view of a baffle structure 440 having rectangular segments forming a pyramidal base structure. Rectangular segments are formed with rows and columns of vane-baffles forming pyramidal baffle structure as shown in FIG. 6C.

FIGS. 7A and 7B show a docking target indicator with pyramidal baffle structure and conical baffle structure. The baffle structure 440 is made of an optically black material. Electroformed materials, like copper or nickel, or plastics or ceramics may be used to form baffle structure 440. In one aspect of the present disclosure, aluminum with anodic coating thereon is used to form baffle structure 440.

In one aspect of the present disclosure, vane-baffles (440A-440E) may have holes or slots (not shown) to ensure more light reaches gold plating 430. Holes in vane-baffles (440A-440E) help enhance viewing of gold plating 430 as more external light reaches gold plating 430 from all sides.

Figure 8B:
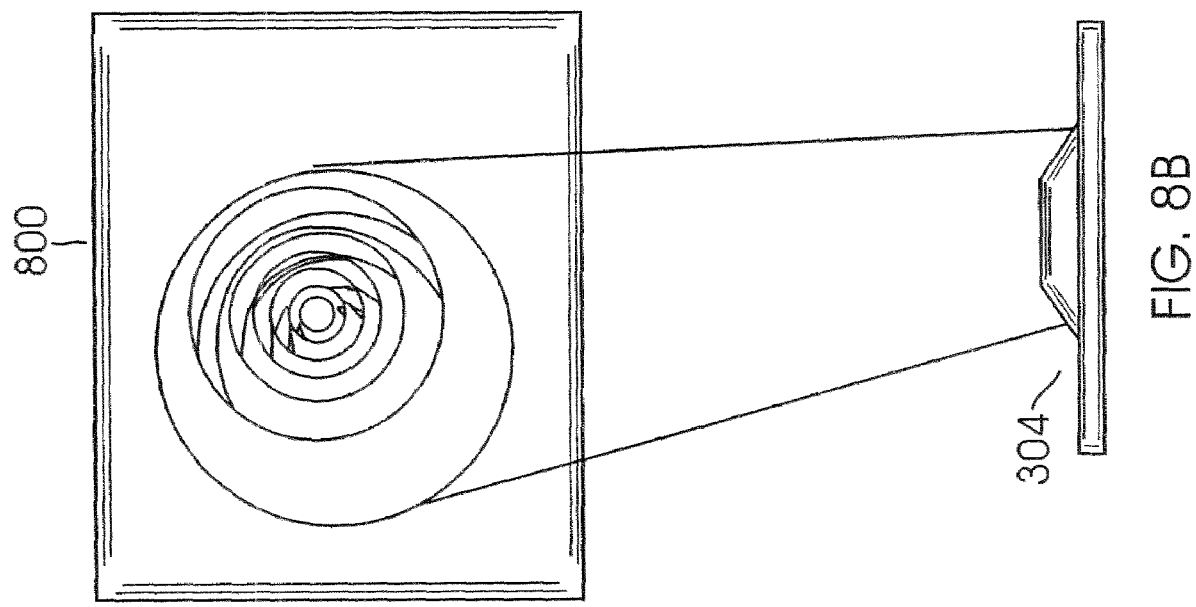
FIG. 8B shows a relationship between a docking target and an image output formed by the docking target, of an embodiment.
Figure 8A:
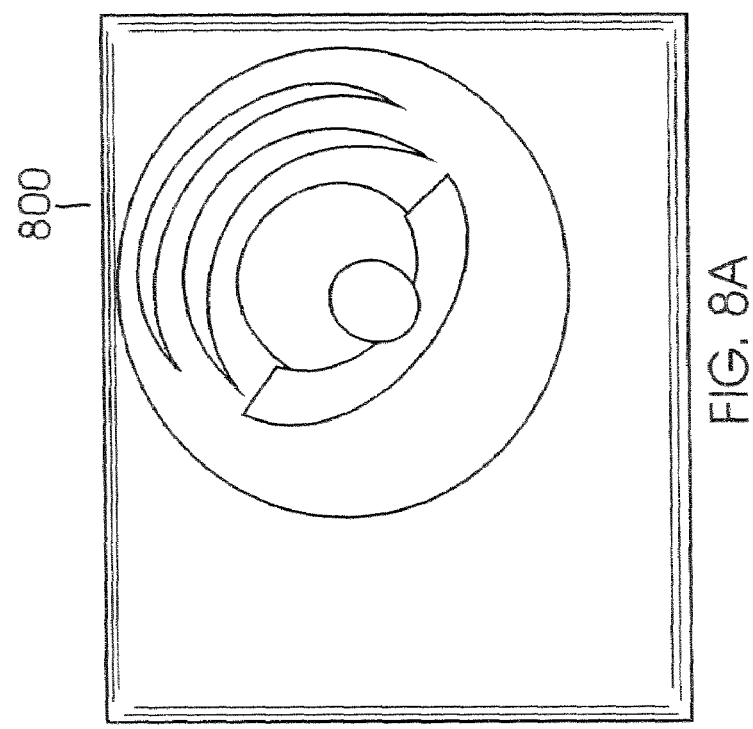
FIG. 8A shows a visual output pattern provided by a docking target, of an embodiment.
Figure 9A:
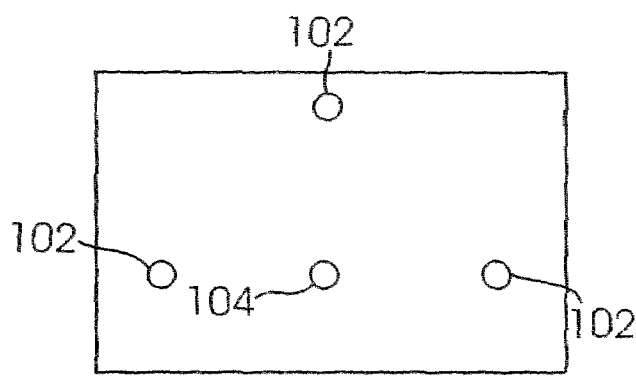
FIGS. 9 (9A-9D) and 10 (10A-10D) show comparative representation of a conventional docking target having protrusions and the docking target of an embodiment.
Figure 10A:
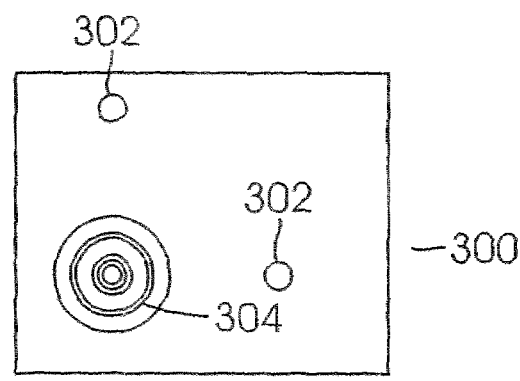
Figure 9B:
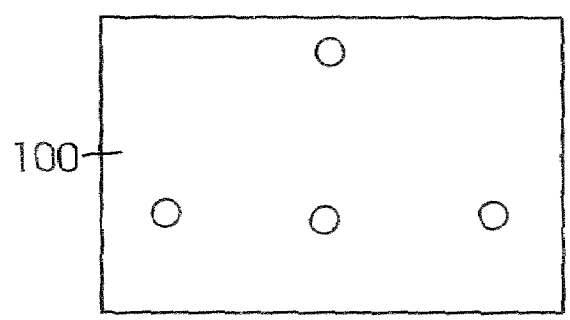
Figure 10B:
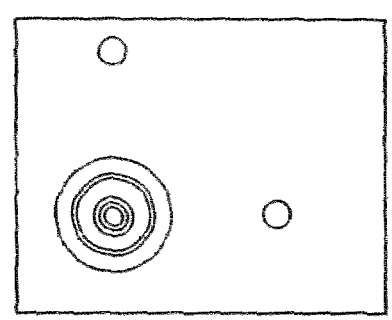
Figure 9C:
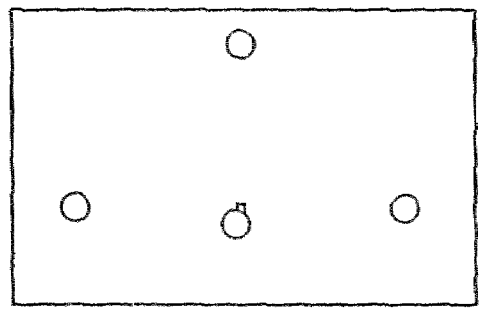
Figure 10C:
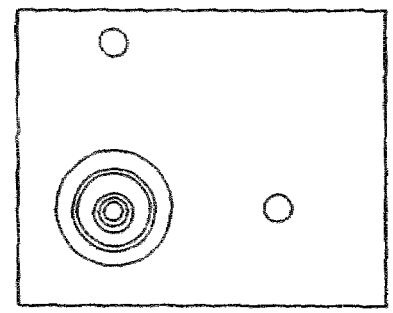
Figure 9D:
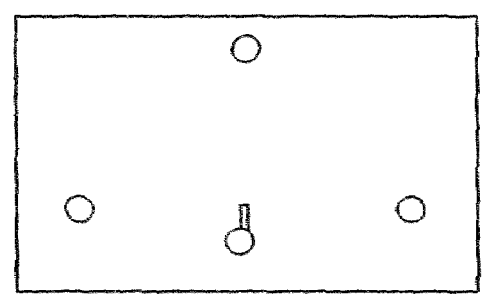
Figure 10D:
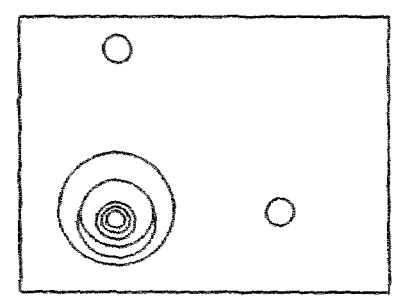
Figure 11A:
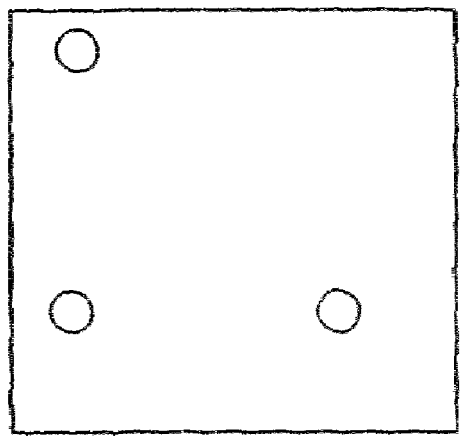
FIGS. 11 (11A-11C) and 12 (12A-12C) show comparative image images formed by the docking device having protrusions and docking target having square grid baffle structure of an embodiment.
Figure 12A:
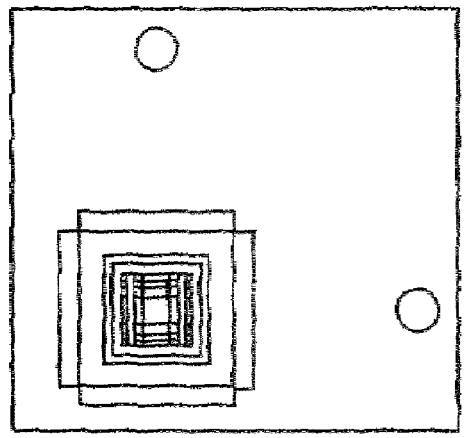
Figure 11B:
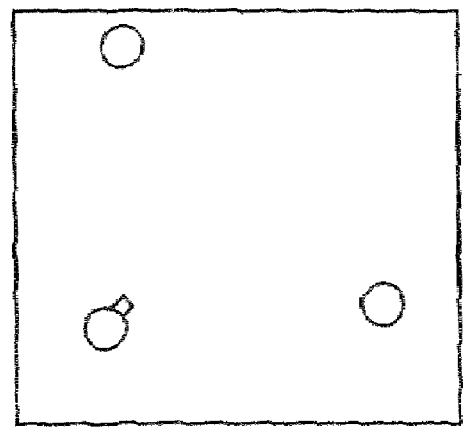
Figure 12B:
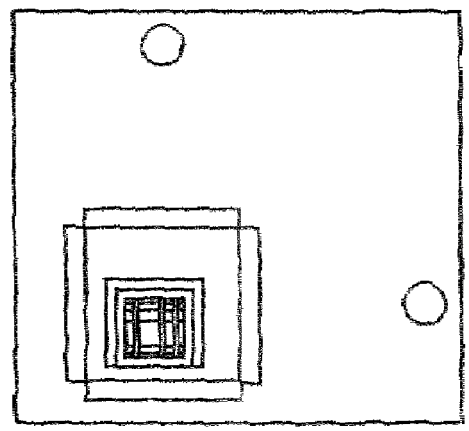
Figure 11C:
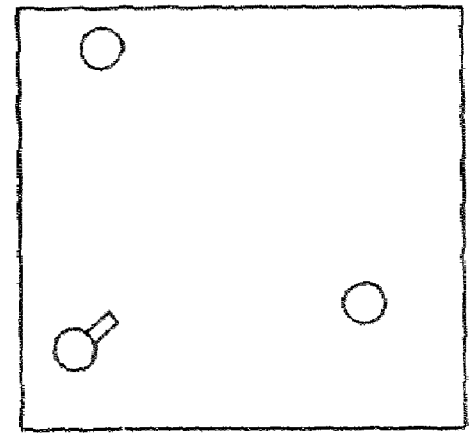
Figure 12C:
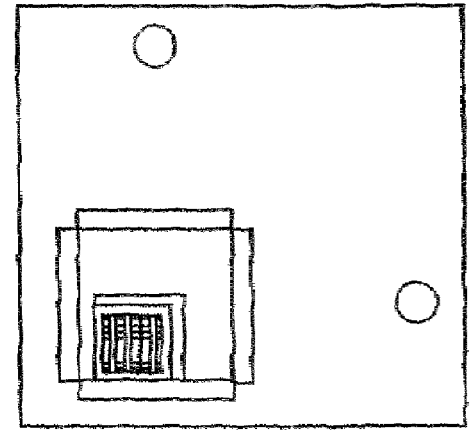

FIG. 8A shows an example of a pattern 800 formed when the docking target indicator 304 is viewed from an angle. Angled, vane-baffles make pattern 800 that changes with angle of vision. FIG. 8B shows the relationship between docking target 304 and an image output 800 formed by docking target 304, according to an aspect of the present disclosure.

FIGS. 9-10 and 11-12 show comparative results of using a conventional docking target having protrusions and the docking target of the present disclosure. FIGS. 9A-9D and 11A-11C show apparent movement of the vertical projection 104 with respect to the flat spots when the angle of vision changes. FIGS. 10A-10D and 12A-12C show the apparent movement of docking target indicator 304 as the vision angle changes. As the angle changes, it looks like the centroid moves. This variation in the image pattern is interpreted by sensor computers (not shown) and then processed to navigational computers (not shown) of space vehicle docking systems.

In one embodiment of the present disclosure, the docking targets are flat and not constrained by any specific wavelength of light. The incident light may be of visible or infrared, or infrared and visible wavelength. The docking targets of the present disclosure lowers risk associated with space vehicle docking and provide optimum results for docking to machine vision systems or the naked eye.

Although the present disclosure has been described with reference to specific embodiments, these embodiments are illustrative only and not limiting. Many other applications and embodiments of the present disclosure will be apparent in light of this disclosure and the following claims.

What is claimed is:

1. A docking target indicator comprising:
a base layer, having a rear surface and a front surface; wherein the front surface of the base layer is reflective; and
a baffle structure secured to the front surface of the base layer; wherein the baffle structure is (i) a conical baffle structure formed of concentric conical segments of increasing diameter with respect to a center of the conical baffle structure, or (ii) a pyramidal baffle structure formed of rectangular segments of increasing dimension with respect to a center of the pyramidal structure.

2. The docking target indicator of claim 1, wherein the baffle structure is a conical structure formed of concentric conical segments of increasing angle with respect to a center of the conical structure.

3. The docking target of claim 1, wherein the baffle structure is formed of columns and rows of vanes with increasing tilt.

4. The docking target of claim 1, wherein the base layer is formed of material selected from a group comprising of aluminum, nickel, copper, ceramic or plastic.

5. The docking target indicator of claim 1, wherein a reflective material is coated on the front surface.

6. The docking target indicator of claim 5, wherein the reflective material includes a series of concentric rings of reflective material.

7. The docking target indicator of claim 5, wherein the reflective material includes a series of rectangular segments.

8. The docking target of claim 5, wherein the reflective material is gold or ground-up semiconductor.

9. The docking target indicator of claim 1, wherein the baffle structure includes an optically black material.

10. The docking target indicator of claim 1, wherein the baffle structure includes aluminum with black anodic coating thereon.

11. A docking target for a docking device comprising:
a docking target indicator having a base layer with a rear surface and a front surface; wherein the front surface of the base layer is reflective; and a baffle structure is secured to the front surface of the base layer, wherein the baffle structure is (i) a conical baffle structure formed of concentric conical segments of increasing diameter with respect to a center of the conical baffle structure, or (ii) a pyramidal baffle structure formed of rectangular segments of increasing dimension with respect to a center of the pyramidal structure.

12. The docking target of claim 11, wherein the baffle structure is a conical structure formed of concentric conical segments of increasing angle with respect to a center of the conical structure.

13. The docking target of claim 11, wherein the baffle structure is formed of columns and rows of vanes with increasing tilt.

14. The docking target of claim 11, wherein the base layer is formed of material selected from the groups comprising of aluminum, nickel, copper, ceramic or plastic.

15. The docking target of claim 11, wherein a reflective material is coated on the front surface.

16. The docking target indicator of claim 15, wherein the reflective material includes a series of concentric rings of reflective material.

17. The docking target indicator of claim 15, wherein the reflective material includes a series of rectangular segments of reflective material.

18. The docking target of claim 15, wherein the reflective material is gold or ground-up semiconductor.

19. The docking target of claim 11, wherein the baffle structure includes an optically black material.

20. The docking target of claim 11, wherein the baffle structure includes aluminum with black anodic coating thereon.

21. The docking target of claim 11, wherein the docking target is used on a spacecraft.

* * * * *